US007958011B1

(12) United States Patent
Cretney et al.

(10) Patent No.: US 7,958,011 B1
(45) Date of Patent: Jun. 7, 2011

(54) OBTAINING COMMUNITY ASSOCIATION DATA IN A DIRECT, EFFICIENT MANNER

(75) Inventors: William Robert Cretney, Ann Arbor, MI (US); Mark Labarr Lewis, Tucson, AZ (US)

(73) Assignee: Associations, Inc., Dallas, TX (US)

( * ) Notice: Subject to any disclaimer, the term of this patent is extended or adjusted under 35 U.S.C. 154(b) by 1281 days.

(21) Appl. No.: 11/499,501

(22) Filed: Aug. 4, 2006

(51) Int. Cl.
*G06F 30/00* (2006.01)
(52) U.S. Cl. .......................................... 705/26; 705/27
(58) Field of Classification Search .................. 705/26, 705/27
See application file for complete search history.

(56) References Cited

U.S. PATENT DOCUMENTS

| | | | | |
|---|---|---|---|---|
| 5,857,174 | A * | 1/1999 | Dugan | 705/313 |
| 6,594,633 | B1 * | 7/2003 | Broerman | 705/313 |
| 6,766,322 | B1 * | 7/2004 | Bell | 1/1 |
| 7,584,167 | B1 * | 9/2009 | Bell | 1/1 |
| 2003/0177071 | A1 * | 9/2003 | Treese et al. | 705/26 |
| 2007/0089053 | A1 * | 4/2007 | Uhlig et al. | 715/513 |

OTHER PUBLICATIONS

Business Wire, "Homestore.com, Inc., National association of realtors launch realtors electronic transaction platform with key industry players", dated May 22, 2000.*
Pr Newswire, "First American Real Estate solutions offers complete data fulfillment solution to mortgage services", dated Feb. 25, 2003.*

* cited by examiner

*Primary Examiner* — Mark Fadok
(74) *Attorney, Agent, or Firm* — Jerry M. Keys; Matheson Keys Garsson & Kordzik PLLC (57) ABSTRACT

A method, computer program product and system for obtaining property owner or community association data. An order for a selection of products is directly received from a requestor. The order is built using a master questionnaire, which is stored on a database from which all sub-questionnaires (products) are created. As all "products" are created at the moment the order is placed, the information (community association data) in the master questionnaire is the information which will be incorporated into each sub-questionnaire. By receiving an order directly with the requestor and building the order using a master questionnaire which includes questions and answers that may be incorporated into the sub-questionnaires (products), the association data may be obtained by requestors in a direct, efficient manner without the use of a third party service provider.

46 Claims, 8 Drawing Sheets

OBTAINING COMMUNITY ASSOCIATION DATA IN A DIRECT, EFFICIENT MANNER

TECHNICAL FIELD

The present invention relates to the field of automated information and document retrieval for vertical business applications, and more particularly to managing and processing community association data to permit the association and information requestors (e.g., title companies, real estate agents) to retrieve information and documents about the association, its members and its activities in a direct, efficient manner that does not require the use of another third party service provider.

BACKGROUND INFORMATION

Historically, "property owners associations" referred to an organization comprised of owners of units in a real estate development, such as a residential housing, condominium or retirement community. Such associations were sometimes commonly referred to as "homeowners" associations. With the introduction of "property owners associations" into the real estate market several decades ago, a new set of challenges developed for those who needed to gather information about these associations in regards to real estate financing, refinancing, and sale/resale transactions. For example, a title company may desire information regarding the bylaws of the association and title of a home being sold or purchased whose owner is a member of the homeowners association. In another example, a real estate agent may desire information for a client (e.g., potential purchaser of a home which is owned by a member of a condominium association). Those that desire such information may be referred to herein as "requestors." Information desired by requestors may range from general knowledge of the service assessment fees and amenities or services provided for the assessment fees, to more detailed and specific information regarding fee assessment account balances and legal activities in regards to the association bylaws, etc., and/or individual association members (e.g., property description).

Gathering this information has proven to be difficult and time consuming for the requestors as the typical property owners association is "managed" by a "management services provider" known in the industry as a "portfolio association management company." These management companies typically manage between 5 and 500 property owner associations simultaneously. As the associations may change management companies often, keeping up with who is managing what property association is a challenge in itself. Even when the industry professional determines which management services company to contact, there is no standardization of information transfer in the industry. Couple this lack of consistency with the fact that the specifics of information required to be provided is determined by individual state statutes (e.g., deeds, by-laws, etc. have different requirements in different states), any attempt at regional or national standardization is unworkable.

Over the years, the association management industry has approached this dilemma by using pencil/paper/mail/fax methods, whereby the management company (or an association itself) would receive some sort of "request," then manually process the request, and send it back (mail/fax/etc) to the requestor.

There has been limited automation in the association management market in that other third party companies have developed server-based or web-based methods to order, and/or process, these requests from requestors either to the association or to the management company. The limitation of these programs and existing protocols is that the "product" produced is the same from state to state, or nationally, even when the state statutory or regulatory requirements impose disparate and conflicting requirements as to the type of information or documents required to be delivered. A larger problem for the industry is that the web-based automated products being used require the requestors to contact another service provider directly, as opposed to being able to continue the work directly with the association and/or association management company. This interruption of the business relationship between the requestors and the association or the association management company results in loss efficiencies and continuity for both the requestors, as well as the associations and/or association management companies.

The problem has been exasperated as the role of property owner associations have expanded and in effect have become "community associations" due to the additional non-real estate property specific services offered. The dilemma has been how to use a single processing system, which will meet all existing (and all future) state statutes, as well as designed to deliver an ever-increasing "number of products," without interrupting the business relationship between the requestors and the "community association" and/or association management companies. These products will be identified by different terms across the country, but are related to the same type of real estate and financial matters. Examples would be "resale disclosure packages," "resale certifications," "estoppel letters," "status letters," "statements of account," "mortgage questionnaires," "lender questionnaires," "condominium certifications," "planned area development (PUD) forms," "rental applications," "association governing documents," "appraisal information," "covenant compliance information," "realtor listing information," "occupancy ratios," "annual disclosure reports," "reserve studies," "budgets," "minutes," and a multitude of additional "association related and/or state statute related reports, information and documents."

Therefore, there is a need in the art for requestors to obtain data relating to "community associations" and to the members and the members' properties that are serviced by the association in a direct, efficient manner without the use of another third party service provider.

SUMMARY

The problems outlined above may at least, in part, be solved in some embodiments by receiving an order for a selection of products directly from a requestor and then building the order using a master questionnaire, which is stored on a database from which all sub-questionnaires (products) are created. As all "products" are created at the moment the order is placed, the information (community association data) in the master questionnaire is the information which will be incorporated into each sub-questionnaire. An example would be a lender questionnaire. At the moment of the order, the 85 questions and answers, which comprise the product known as the "lender" questionnaire, would have been pulled from the master questionnaire, and placed in the appropriate location of the product to be delivered to the lender. By receiving an order directly from the requestor and building the order using a master questionnaire which includes questions and answers that may be incorporated into the sub-questionnaires (products), requestors can obtain the community association data from the community association in a direct, efficient manner.

In one embodiment of the present invention, a method for obtaining association data comprises the step of receiving an order for a selection of one or more products from a requestor, where a description of the selection of one or more products is displayed to the requestor. The method may further comprise building the order where building the order comprises the step of obtaining appropriate information from a profile of the requestor. Building the order may further comprise obtaining a master questionnaire, where the master questionnaire is associated with a association, where the association pre-answers one or more of a set of questions contained in the master questionnaire. Building the order may further comprise building a sub-questionnaire, where information in the master questionnaire is incorporated into the sub-questionnaire. Building the order may further comprise acquiring appropriate data to be placed into an order package. The method may further comprise determining a price of the order based on pricing tables. The method may further comprise providing one or more payment methods for the price of the order. The method may further comprise delivering the selection of one or more products ordered to the requestor.

The foregoing has outlined rather generally the features and technical advantages of one or more embodiments of the present invention in order that the detailed description of the invention that follows may be better understood. Additional features and advantages of the invention will be described hereinafter which may form the subject of the claims of the invention.

BRIEF DESCRIPTION OF THE DRAWINGS

A better understanding of the present invention can be obtained when the following detailed description is considered in conjunction with the following drawings, in which.

DETAILED DESCRIPTION

Even though the following discusses the present invention in connection with associations providing information about properties or members being managed by associations in the real-estate area, the principles of the present invention may be applied to other areas where "requestors" need to acquire information and documents from an organization that possesses both, and provides such information on a regular and reoccurring basis to the same or similar requestors. A person of ordinary skill in the art would be capable of applying the principles of the present invention to such areas. Further, embodiments covering such areas would fall within the scope of the present invention.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

Figure 1:
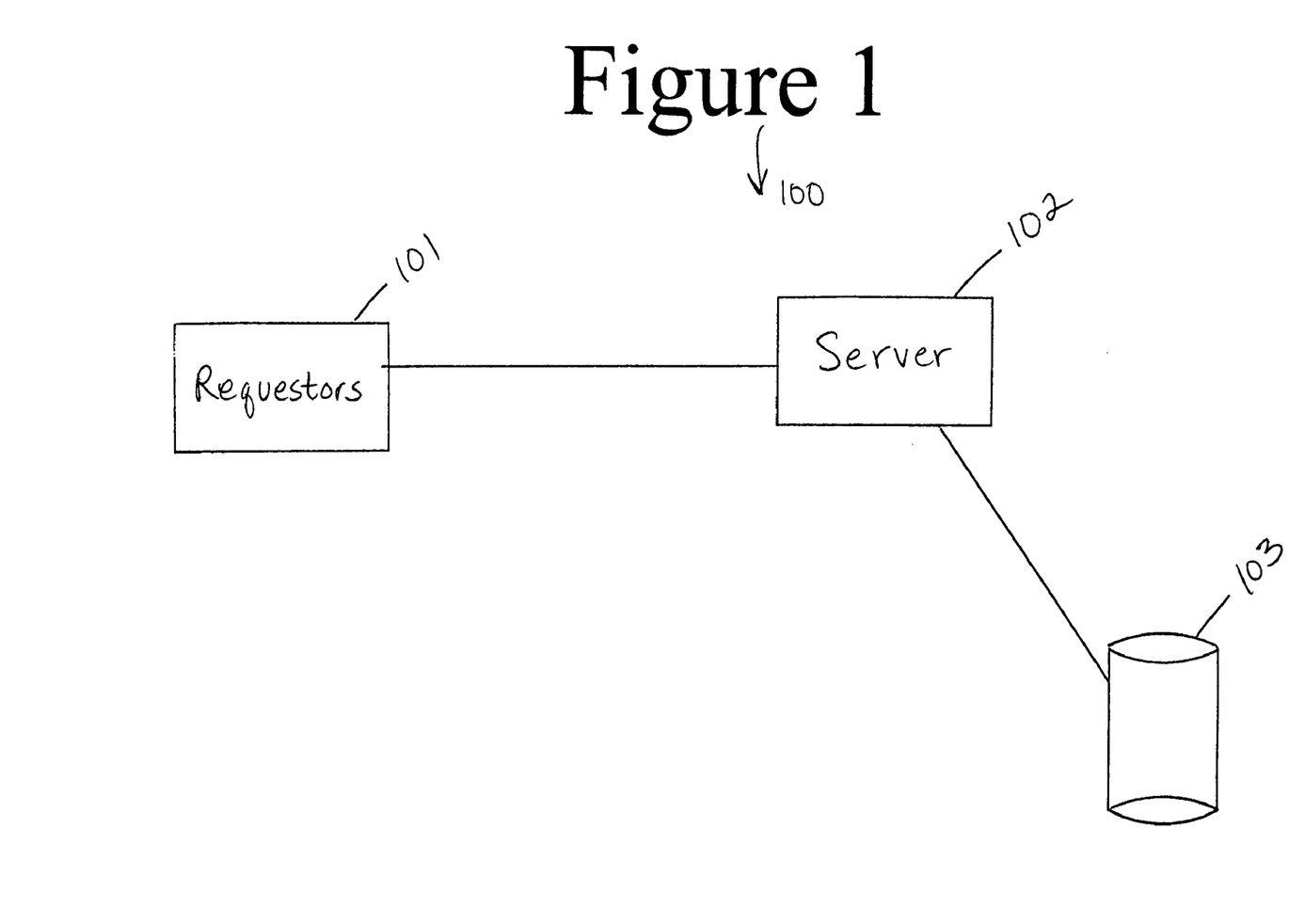
FIG. 1 illustrates a network system for obtaining community association data configured in accordance with an embodiment of the present invention.

FIG. 1 illustrates a network system 100 for obtaining community association data configured in accordance with an embodiment of the present invention. Requestors 101 obtain community association data from a server 102 (referred to herein as "processing system") coupled to a database 103, which stores various information, such as master questionnaires, requestor profiles, standard forms, custom forms, records of the orders, etc. Requestors 101 may refer to individuals or companies that desire community association data. Further, requestors 101 may represent any number of requestors. A more detailed description of processing system 102 is provided below in association with FIG. 2. In one embodiment, processing system 102 is implemented using an application service provider model wherein multiple associations can access and use system 102 remotely over the Internet or other telecommunications link and in effect "share" the application to provide their association information to requestors. FIG. 1 may include additional components that were not depicted for ease of understanding. The scope of the present invention is not limited to the embodiment illustrated in FIG. 1.

Figure 2:
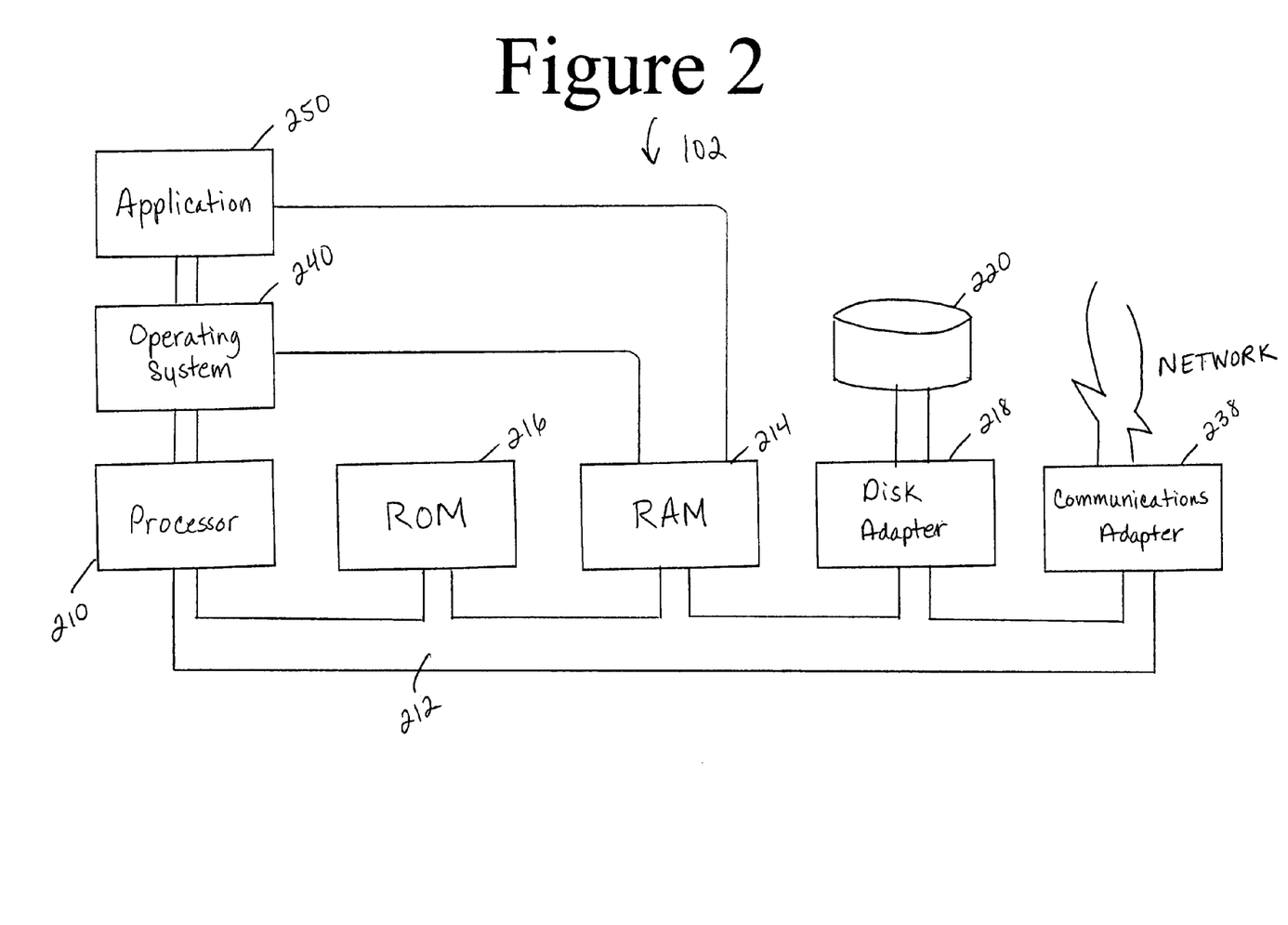
FIG. 2 illustrates a hardware configuration of a computer system configured in accordance with an embodiment of the present invention.

FIG. 2 illustrates a typical hardware configuration of processing system 102 (FIG. 1) which is representative of a hardware environment for practicing the present invention. Referring to FIG. 2, processing system 102 may have a processor 210 coupled to various other components by system bus 212. An operating system 240 may run on processor 210 and provide control and coordinate the functions of the various components of FIG. 2. An application 250 in accordance with the principles of the present invention may run in conjunction with operating system 240 and provide calls to operating system 240 where the calls implement the various functions or services to be performed by application 250. Application 250 may include, for example, an application for providing requested community association data directly to requestor 101 (FIG. 1), as described below in association with FIGS. 3-8.

Referring to FIG. 2, Read-Only Memory (ROM) 216 may be coupled to system bus 212 and include a basic input/output system ("BIOS") that controls certain basic functions of processing system 102. Random access memory (RAM) 214 and disk adapter 218 may also be coupled to system bus 212. It should be noted that software components including operating system 240 and application 250 may be loaded into RAM 214 which may be processing system's 102 main memory for execution. Disk adapter 218 may be an integrated drive electronics ("IDE") adapter that communicates with a disk unit 220, e.g., disk drive. The application for providing requested community association data directly to requestor 101 (FIG. 1), as described below in association with FIGS. 3-8, may reside in either disk unit 220 or in application 250.

Referring to FIG. 2, processing system 102 may further include a communications adapter 238 coupled to bus 212. Communications adapter 238 may interconnect bus 212 with an outside network, e.g., Local Area Network (LAN), Wide Area Network (WAN), enabling system 102 to communicate with other such systems.

Implementations of the invention include implementations as a computer system programmed to execute the method or methods described herein, and as a computer program product. According to the computer system implementations, sets of instructions for executing the method or methods may be resident in the random access memory 214 of one or more computer systems configured generally as described above. Until required by processing system 102, the set of instructions may be stored as a computer program product in another computer memory, for example, in disk unit 220. Furthermore, the computer program product may also be stored at another computer and transmitted when desired to the user's workstation by a network or by an external network such as the Internet. One skilled in the art would appreciate that the physical storage of the sets of instructions physically changes the medium upon which it is stored so that the medium carries computer readable information. The change may be electrical, magnetic, chemical or some other physical change.

As stated in the Background Information section, there has been limited automation in the market in that companies have developed server-based or web-based methods to order and/or process these requests from requestors. The limitation of these programs and existing protocols is that the "product" produced is the same from state to state, or nationally, even when the state statutes and regulations in these other states require the delivery of different information, different documents, etc. A larger problem for the industry is that the web-based automated products being used require the requestors to contact the third party web-based processing company directly, as opposed to being able to continue the work directly with the association and/or association management company. This interruption of the business relationship between the requestors and the association management companies results in loss efficiencies and continuity for both the requestors, as well as the associations and/or association management companies. The dilemma has been how to use a single processing system, which will meet all existing (and all future) state statutes and regulations, as well as designed to deliver an ever-increasing "number of products," required by community associations and the real estate and financial services industries without interrupting the business relationship between the requestors and the association and/or association management companies. Therefore, there is a need in the art to obtain data on community associations, their members, and the members' property by requestors in a direct, efficient manner without the use of a service provider other than the community association. Community association data may be obtained directly by requestor 101 as described below in connection with FIGS. 3-8.

Figure 3:
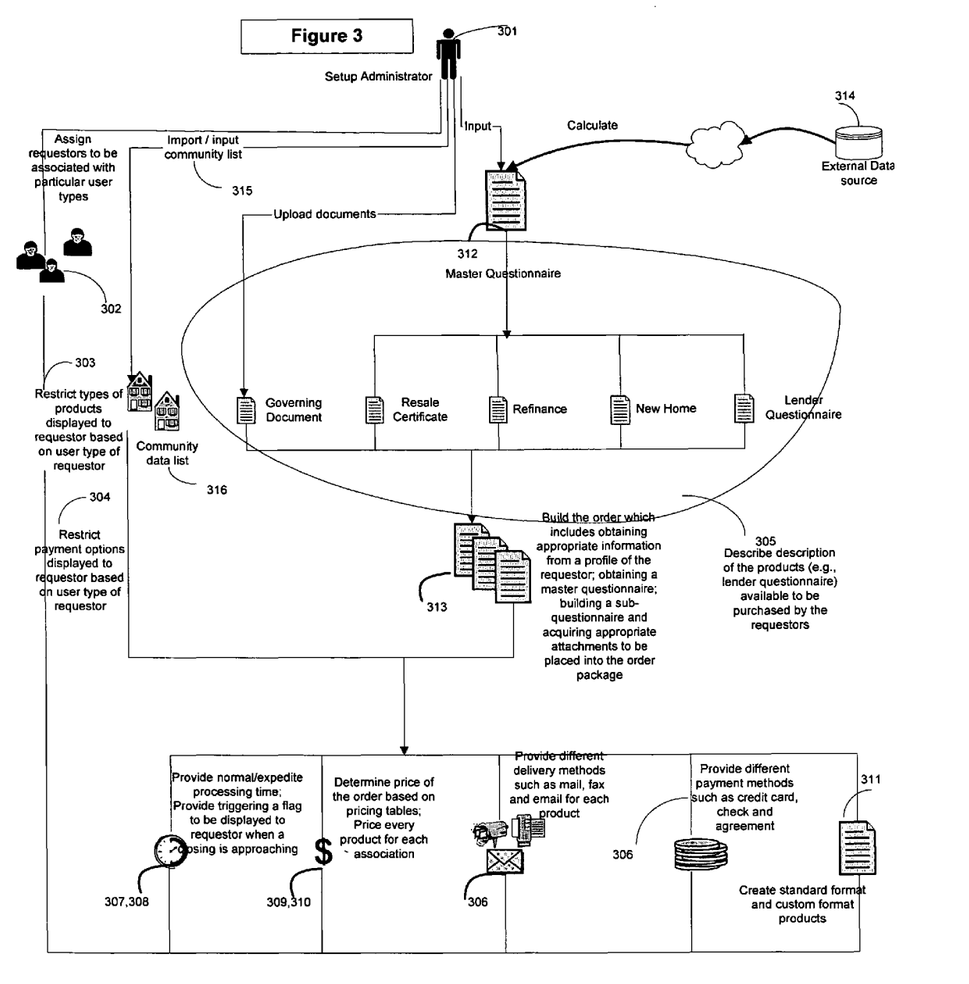
FIG. 3 illustrates setting up the processing system for receiving orders from requestors to obtain community association data in accordance with an embodiment of the present invention.

Referring to FIG. 3, in conjunction with FIGS. 1-2, FIG. 3 illustrates setting up processing system 102 for receiving orders from requestors 101 to obtain community association data in accordance with an embodiment of the present invention. A set up administrator 301 assigns requestors 101 to be associated with particular user types in step 302. By assigning requestors 101 to be associated with particular user types, processing system 102 allows the association and/or management company to identify which products those user types will see, and what payment options those requestors are permitted to use, as discussed further below. By being able to establish and restrict access by user type, the association and/or management company is able to meet all statutory and regulatory requirements related to privacy and legal access, as well as payment options, where regulated by law.

In step 303, system 102 restricts the types of products displayed to requestor 101 based on the user type of requestor 101. In step 304, system 102 restricts payment options displayed to requestor 101 based on the user type of requestor 101.

Further, administrator 301 of the association and/or management company performs product descriptions of the products available to be purchased by requestors 101 in step 305. This allows the association and/or management company to have full flexibility to describe the product directly on the "order screen" as well as allows requestor 101 to see exactly which products are designed to comply with which specific statutes, as well as understand which "products" may be part of a "package of products" available to meet the needs of a specific type of real estate transaction/activity.

Additionally, system 102 provides requestors 101 with various type of delivery methods (e.g., mail, fax, electronic mail) as well as various types of payment options (e.g., credit card, check) in step 306. In one embodiment, administrator 301 of the association and/or management company may set up processing system 102 to have such types of delivery methods (e.g., mail, fax, electronic mail) as well as various types of payment options (e.g., credit card, check). Further, requestors 101 will have the option of choosing different delivery methods based on the product being ordered. This ability to offer delivery options "per product" prevents requestor 101 from believing that selected products are available by delivery means not actually possible. Delivery options can be unlimited, and can be identified by any desired terminology. Typically deliver methods would include "e-mail, hard copy, compact disc, fax, courier, pick up, etc." In addition, the association and/or management company can set individual pricing for each type of delivery option.

Furthermore, system 102 provides normal/expedited processing times and fees for various products in different state or country jurisdictions in step 307. A management company may subsequently be able to offer the same product, in various states with different expedite fees, to coincide with the statutes and implementing regulations in each state respectively. The association and/or management company can also establish what the word "expedite" actually means by displaying on the order screen what "normal delivery time" would be as well as what the "expedited time frame" would be.

Additionally, system 102 is able to "trigger a flag" on a preparer's (a preparer is discussed below) screen when a "closing" is approaching in step 308. The flag can be set to any number of days, from 1 to 10 days.

Furthermore, from the products and options chosen by requestor 101, system 102 determines the price of the order based on pricing tables in step 309. The pricing tables, which may be stored in database 103, may include the established pricing as determined appropriate by the community association or its management company. These payment tables are used to ensure the proper payment is received before the order can be delivered to the requestor.

In step 310, administrator 301 is able to price every product ("product" referred to herein includes services) differently for every "association" set up in system 102, thereby allowing a management company to have 100% flexibility in setting pricing for the different associations that it manages. Two typical applications of the importance of this flexibility would be (1) to allow a "resale disclosure package" for two associations, in two different states, to have two separate fees, based upon the different laws in such states, and (2) allow separate pricing for a "covenants compliance inspections" for two different communities based on the reality that one community is a condominium and the other a single-family, detached home. Given the dramatically different amount of effort to perform a covenant inspection in a condominium versus a single-family home, individual pricing flexibility within the application is extremely important.

Administrator 301 may create "standard format products," and "custom format products" in step 311. Standard format products may either be direct image PDF's or a question and answer format best described as a "narrative." Custom format products are typically used when columns or special needs are identified by an association and/or management company. A typical use of a custom product format would be a series of columns in which "money fields from the master questionnaire" have been automatically imported. This custom feature allows the association and/or management company to design unique and specific tables, which are then coded to add, subtract, and make other comparative calculations related to the other information in such tables. In one embodiment, the standard format and custom format products are stored in database 103 accessible by processing system 102.

Referring to FIG. 3, the master questionnaire (indicated by label 312) is used to create sub-questionnaires (products). As all "products" are created at the moment the order is placed, the information in master questionnaire 312 is the information (e.g., questions and answers) which will be incorporated into each sub questionnaire. "Calculate" is a term used to instruct system 102 to retrieve the information from an external database 314 (not database 103). This feature is used to allow processing system 102 to acquire information, in real time, from other databases. One application of this feature is the ability of system 102 to "acquire" an association member's current balance from the accounting software used by that association and/or management company. As every question in master questionnaire 312 could be configured as a "calculate answer," system 102 could completely pre-populate every answer in every sub-questionnaire/product at the exact moment the order is placed from multiple internal and external databases.

At the moment an order is placed by requestor 101, as discussed in further detail below, system 102 builds the order in step 313. Building the order includes the process of building a sub-questionnaire(s) as well as "pulling" the appropriate attachments "into the order package". Typically, there would be a two-part sub questionnaire as well as 3 to 6 attachments that comprise an "order/product". Building the order may include obtaining information from a profile of requestor 101. Each requestor 101 may have a profile as discussed further below in association with FIG. 5. Building the order may further include obtaining a master questionnaire 312, where master questionnaire 312 is associated with a community association. In master questionnaire 312, one or more of a set of questions may be pre-answered by the community association. A more detail description of master questionnaire 312 is discussed further below in connection with FIG. 4. Building the order may further include building a sub-questionnaire (product) where information in master questionnaire 312 is incorporated into the sub-questionnaire. A more detail description of building a sub-questionnaire is discussed further below in connection with FIG. 4. Further, building the order includes acquiring appropriate attachments (e.g., copies of deeds, statements of account, community association governing documents) to be placed into the order package.

Referring again to FIG. 3, an "import/input community list" 315 is a "set up" item, which may require the selection of one of two methods of generating the list of communities managed by that association or management company. Requestors 101 may only request products and services related to the communities managed by that management company. Therefore, the set up may include either: (1) the list of communities from an existing list of communities in another database; or (2) manually enter a list of "available communities" during the "set up." Without this step of the set up, there may be no communities to select.

In regards to "community data list" 316, the set up includes the ability of the association and/or management company to establish specific "note fields" tied to a specific community. Community data list 316 may allow the association/management company to be able to inform requestors 101, (when that community is chosen) that the same community may be a sub-association of a "master association," for which requestor 101 will need to order "separate information and services." For example, many small, upscale-gated communities may actually be sub-associations of master community associations, and home/unit owners are actually paying dues to both associations. By providing an opportunity to "set up" such notes, which are triggered when "specific communities are chosen," requestors 101 will understand that what they are ordering does not comprise all that they need to order.

FIG. 3 may include other or additional aspects that were not depicted for clarity. The steps referred to above may be executed in any order and that the order discussed in connection with FIG. 3 is illustrative. Certain steps depicted in FIG. 3 may be executed in a substantially simultaneous manner or may be omitted.

Figure 4:
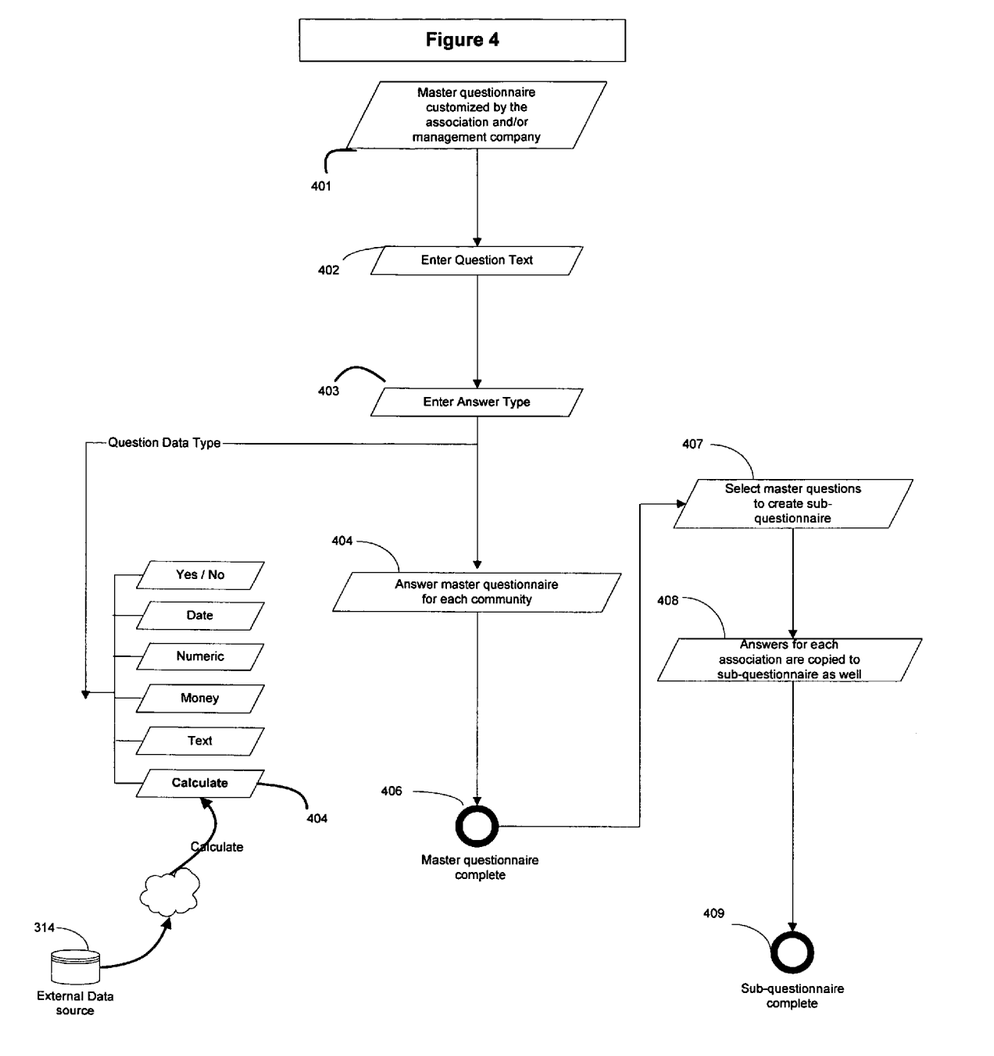
FIG. 4 illustrates setting up the master questionnaire in accordance with an embodiment of the present invention.

After processing system 102 is set up for receiving orders from requestors 101 to obtain community association data, master questionnaire 312 is set up as illustrated in FIG. 4.

FIG. 4 illustrates setting up master questionnaire 312 in accordance with an embodiment of the present invention. Referring to FIG. 4, in conjunction with FIGS. 1-3, master questionnaire 312, not available for purchase directly, is customized by the association and/or management company in step 401. As stated above, master questionnaire 312 may be stored in database 103. All sub-questionnaires (products) may be created from master questionnaire 312. As all "products" are created at the moment the order is placed, the information in master questionnaire 312 is the information which will be incorporated into each sub-questionnaire. An example would be a lender questionnaire. At the moment of order, the 85 questions and answers, which comprise the product known as lender questionnaire, would have been pulled from master questionnaire 312, and placed in the appropriate location of the product to be delivered to the lender. Master questionnaire 312 includes not only questions and answers, but also date fields, titles, instructions, and many other fields, which become part of the format of the sub-questionnaires. The questions, titles, and all other information on master questionnaire 312 are created by, modified, deleted and supplemented by the association and/or management company.

Further, each management company/association may have their own master questionnaire. By allowing separate master questionnaire responses for each community association or sub association, the management company/association is allowed to "pre-answer" all questions for a specific association. Further, each association is allowed to have a separate and potentially different answer to the exact same question. An example would be "how many homes will be in the community at build out?"

After the question text is entered in master questionnaire 312 by administrator 301 in step 402, the answer type is entered in step 403. All questions in master questionnaire 312 may be assigned an "answer type." The association and/or management company has the ability to use any "answer type" they desire to answer any question. The types of answers would typically be "yes/no," "money," "date," "short text-limited characters," "longer text-extended characters," etc. Additional "answer types" may be implemented.

One type of "answer" is a "calculate" as illustrated in step 404. Calculate is the term used to instruct the program of the present invention 250 to retrieve the information from external database 314. This feature is used to allow processing system 102 to acquire information, in real time, from other databases than database 103. One application of this feature is the ability of system 102 to "acquire" an association member's current balance from the accounting software used by that association and/or management company. As every question in master questionnaire 312 could be configured as a "calculate answer," system 102 could completely pre-populate every answer in every sub-questionnaire/product from multiple external databases at the exact moment the order is placed.

After answering master questionnaire 312 for each community in step 405, the set up of master questionnaire 312 is complete in step 406.

Sub-questionnaires may be created based on master questionnaire 312 by first selecting master questionnaire 312 to create the sub-questionnaire in step 407. An association and/or management company may be allowed to choose which questions they feel should be "answered in advance on the master questionnaire" for a specific community and which questions should be "answered at the time the order is placed" by a staff member at an association and/or management company, such as a preparer. This decision can be made question-by-question and association-by-association providing maximum flexibility. The decision regarding which questions to answer in advance, and which not to, can be modified at any time, by the association and/or management company. The questions/answers that are determined to be answerable in advance are copied from master questionnaire 312 to the sub-questionnaire in step 408. The sub-questionnaire is completed in step 409.

FIG. 4 may include other or additional aspects that were not depicted for clarity. The steps referred to above may be executed in any order and that the order discussed in connection with FIG. 4 is illustrative. Certain steps depicted in FIG. 4 may be executed in a substantially simultaneous manner or may be omitted.

Figure 5:
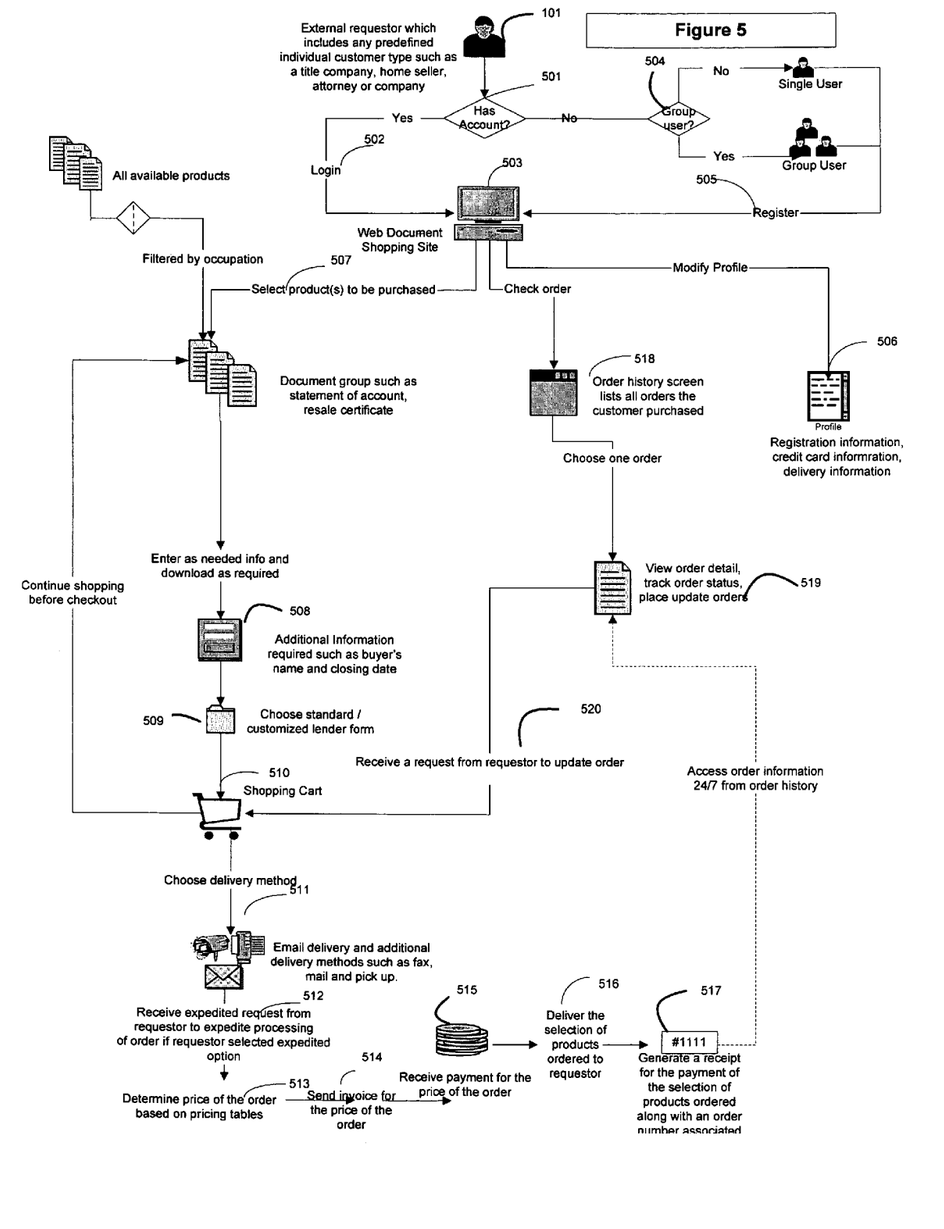
FIG. 5 illustrates a requestor ordering a selection of products in accordance with an embodiment of the present invention.

After set up of master questionnaire 312 and sub-questionnaire, requestor 101 requests an order to purchase a selection of products ("products" referred to herein includes products and services, such as "resale disclosure packages," "resale certifications," "estoppel letters," "status letters," "statements of account," "mortgage questionnaires," "lender questionnaires," "condominium certifications," "planned area development (PUD) forms," "rental applications," "association governing documents," "appraisal information," "covenant compliance information," "realtor listing information," "occupancy ratios," "annual disclosure reports," "reserve studies," "budgets," "minutes," and a multitude of additional "association related and/or state statute related reports, information and documents") as illustrated in FIG. 5.

FIG. 5 illustrates a requestor (FIG. 1) 101 ordering a selection of products in accordance with an embodiment of the present invention. Referring to FIG. 5, in conjunction with FIGS. 1 and 2, system 102 determines if requestor 101 has an account in step 501. If requestor 101 has an account, then, in step 502, system 102 logs requestor 101 into the shopping website (if a web-based application) depicted as label 503. Otherwise, system 102 determines if requestor 101 is a group user in step 504. If requestor 101 is a group user, then system 102, in step 505, registers requestor 101 as a group user into shopping website 503. If requestor 101 is not a group user, then system 102, in step 505, registers requestor 101 as a single user into shopping website 503.

System 102 allows the association and/or management company to establish whatever types of users exist in that area/state. System 102 further allows these users to be identified by any terminology desired by the association and/or management company.

Recognizing the reality that requestors 101 could be a person who desires to buy simple documents, on a one-time basis, and may never use the system into the future, whereas other requestors 101 will be multinational corporations, with operations in every state or country, system 102 allows requestors 101 to set up their account as an individual or company. Requestors 101 can also set up their "profile" to allow multiple users to become part of a self-established "user group." Requestors 101 can also establish their own profiles in regards to the person who will be receiving all orders and the person who will receive (if desired) a copy of all orders placed by that requestor 101. In addition, requestors 101 can set up their default delivery separately and distinctly from their business delivery information.

Once requestor 101 has been logged into shopping website 503, requestor 101 can modify the profile of requestor 101 which contains registration information, credit card information and delivery information in step 506.

Further, once requestor 101 has been logged into shopping website 503, requestor 101 selects product(s) to be purchased in step 507. A more detail description of requestor 101 ordering products is described further below in association with FIG. 6. The products available to be purchased are filtered by occupation. After requestor 101 has determined what product is desired, requestor 101 is provided with "drop down screens" allowing requestor 101 to choose the proper association. This level of integration allows requestor 101 to know in advance that they are ordering products for an association, which is in fact, currently being managed by the organization using system 102.

Unlike most, if not all processing software, the amount of information (e.g., buyer's name, closing date) being requested during the "ordering sequence" is automatically adjusted by system 102 based upon the product being requested in step 508. This process allows requestors 101 to order products faster, and prevent an association and/or management company from collection of information about the parties, which is unnecessary for the product being requested. This additional level of privacy protection is noteworthy.

Although system 102 is designed to deliver "standard forms and reports," system 102 is also designed to allow requestor 101 to "select a custom form" to be completed in conjunction with an order in step 509. A typical application of this scenario is a lender who desired to have both the "standard form" as well as a specific "custom form" completed, and delivered electronically, with a lender information package. This ability to allow requestor 101 to include a custom form with their order, then deliver that completed custom form, with the e-delivery of the balance of the order (and archiving of the completed manual form electronically) is a significant advantage as it allow requestor 101 the best of both methods.

If requestor 101 wants to continue to shop, then requestor 101 orders another product in step 507. Otherwise, requestor 101 checkouts in step 510 and selects the delivery method in step 511. The association and/or management company is able to establish "if" expedited processing is available for each product or service, as well as "what the expedite fee" will be for that product or service, as well as the ability to set the expedite fee differently for each product and each association. In step 512, system 102 receives an expedited request from requestor 101 to expedite processing of the order if requestor 101 selected expedited service.

In many states, and many "requests," the party requesting a product would be required to provide "additional paperwork" before their request could be completed or released. One application of this process would be a "new owner profile form" to be completed by the prospective buyer, in conjunction with the resale disclosure inquiry. For example, suppose the buyer is asked to provide information about their vehicles, their pets, etc. This information is used to program gate codes, allow security personnel to assign parking spaces, allow the pets to have the proper community identification tags, etc. System 102 actually delivers the additional forms required to be completed in conjunction with an activity, as part of the "ordering process." In other words, requestor 101 is required to download the proper forms, including completion instructions, before they can complete the ordering process. This unique feature ensures that requestor 101 is aware of the additional information needed, as well as protects the potential buyers privacy by submitting the information directly to the association and/or management company, as opposed to having the person placing the order be required to know that information.

After requestor 101 selects the delivery method and checks out, system 102 determines the price of the order based on pricing tables in step 513. As discussed above, the pricing tables, which may be stored in database 103, may include the established pricing as determined appropriate by the association and/or management company. These payment tables are used to ensure the proper payment is received before the order can be delivered to the requestor.

In step 514, system 102 receives payment for the price of the order from requestor 101. Based on the "set up" established by the specific association and/or management company using system 102, requestor 101 can chose the payment option which best meets their needs for that specific order. Examples of payment options would be payment by check in advance, payment by credit card at the time of order, payment by credit card after order, (but before release of order), payment by check after the transaction is completed. The association and/or management company has the ability to discontinue a payment option to a specific requestor 101, if that specific requestor 101 has proven to be unreliable in regards to that payment type.

In step 515, system 102 delivers the selection of products ordered to requestor 101. In step 516, system 102 generates a receipt for the payment of the selection of products ordered along with an order number. Although the requestor's history is in archives and available to them 24 hours a day, requestor 101 can also print a detailed receipt should the hardcopy document be helpful to them as they complete a matter.

After 30 days the order continues to be archived in history based upon the retention protocol established by the association and/or management company. Requestor 101 has access to these records per the protocol established.

Requestor 101 can view all of the orders purchased in step 517, and then, in step 518, after selecting one of the orders previously purchased, view in detail the selected order, track the status of the selected order as well as update the selected order.

Referring to step 518, system 102 receives a request from requestor 101 to update information related to an earlier order in step 519. Based on the set up as established by the association and/or management company, requestor 101 who is seeking an "update" of information related to an earlier order, can simply access their online history, and click a single "update" button to request the update. This saves requestor 101 time when seeking an update, and allows the person, who will be responding to the update request to have the full information regarding the earlier order. An application of this feature would be a title company seeking a "current assessment balance update" when a closing was delayed beyond a future assessment due date. The association and/or management company can set the number of updates permitted per product and the price of those updates.

Further, requestor 101 can request an update of a previous order by simply choosing the "update button" in their history in step 518 and then continue to checking out at step 510.

To ensure requestor 101 can effectively download all information provided through system 102, internet links are used as the methodology to deliver information and documents to requestor 101. This process prevents e-mail attachment related complications, while allowing requestor 101 to have full and multiple accesses to the information they requested, regardless of any e-mails they may, or may not have saved.

FIG. 5 may include other or additional aspects that were not depicted for clarity. The steps referred to above may be executed in any order and that the order discussed in connection with FIG. 5 is illustrative. Certain steps depicted in FIG. 5 may be executed in a substantially simultaneous manner or may be omitted.

Upon requestor 101 requesting to purchase a selection of products, the order is created as discussed below in association with FIG. 6.

Figure 6:
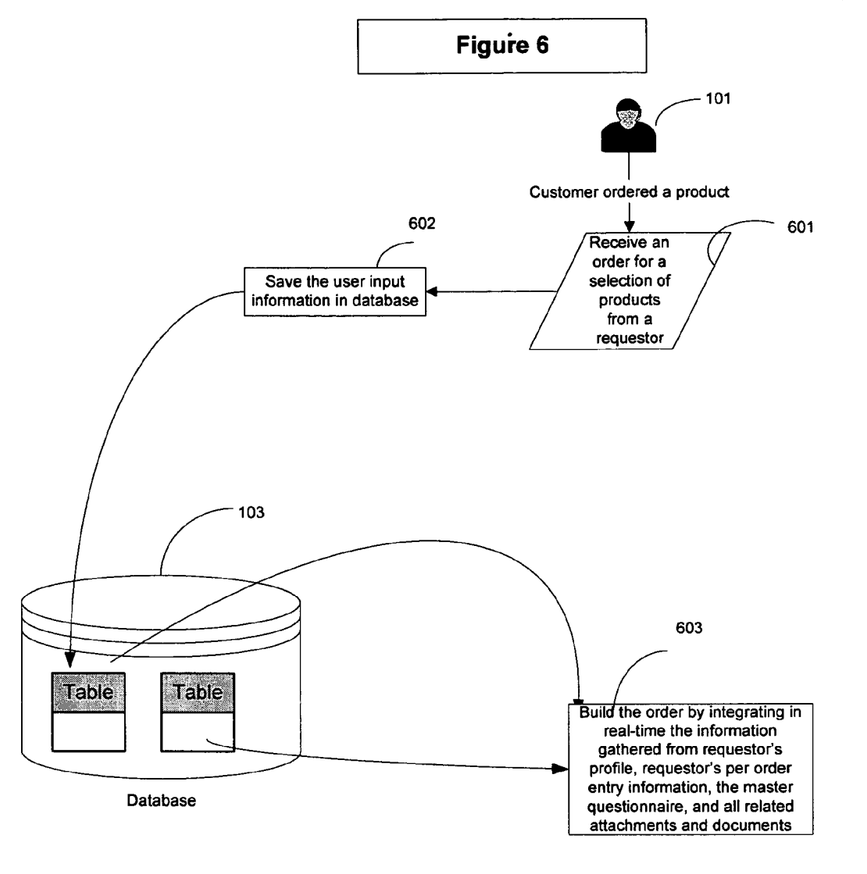
FIG. 6 illustrates creating an order in accordance with an embodiment of the present invention.

FIG. 6 illustrates creating an order in accordance with an embodiment of the present invention. Referring to FIG. 6, in connection with FIGS. 1-3, in step 601, system 102 receives an order for a selection of products from requestor 101. As discussed above, the description for these products is displayed to requestor 101, where the description indicates compliance with specific statutes.

In step 602, system 102 saves the user input information in database 103.

In step 603, system 102 builds the order by integrating in real-time the information gathered from requestor's 101 profile, requestor's 101 per order entry information, master questionnaire 312, and all related attachments and documents. The newly created order includes whatever information was most recently updated and uploaded in the various set up processes. In the event the specific order includes questions from master questionnaire 312 which were answered by way of a "calculate" response, the automatic retrieval of that information, from nearby, or remote databases is accomplished. As orders are created, a record of the order, together with all payment related information is automatically created and entered into the various tracking databases, which allow both requestor 101, as well as the preparers and administrators to determine the status of the order throughout the processing, delivering and archiving cycle.

FIG. 6 may include other or additional aspects that were not depicted for clarity. The steps referred to above may be executed in any order and that the order discussed in connection with FIG. 6 is illustrative. Certain steps depicted in FIG. 6 may be executed in a substantially simultaneous manner or may be omitted.

Figure 7:
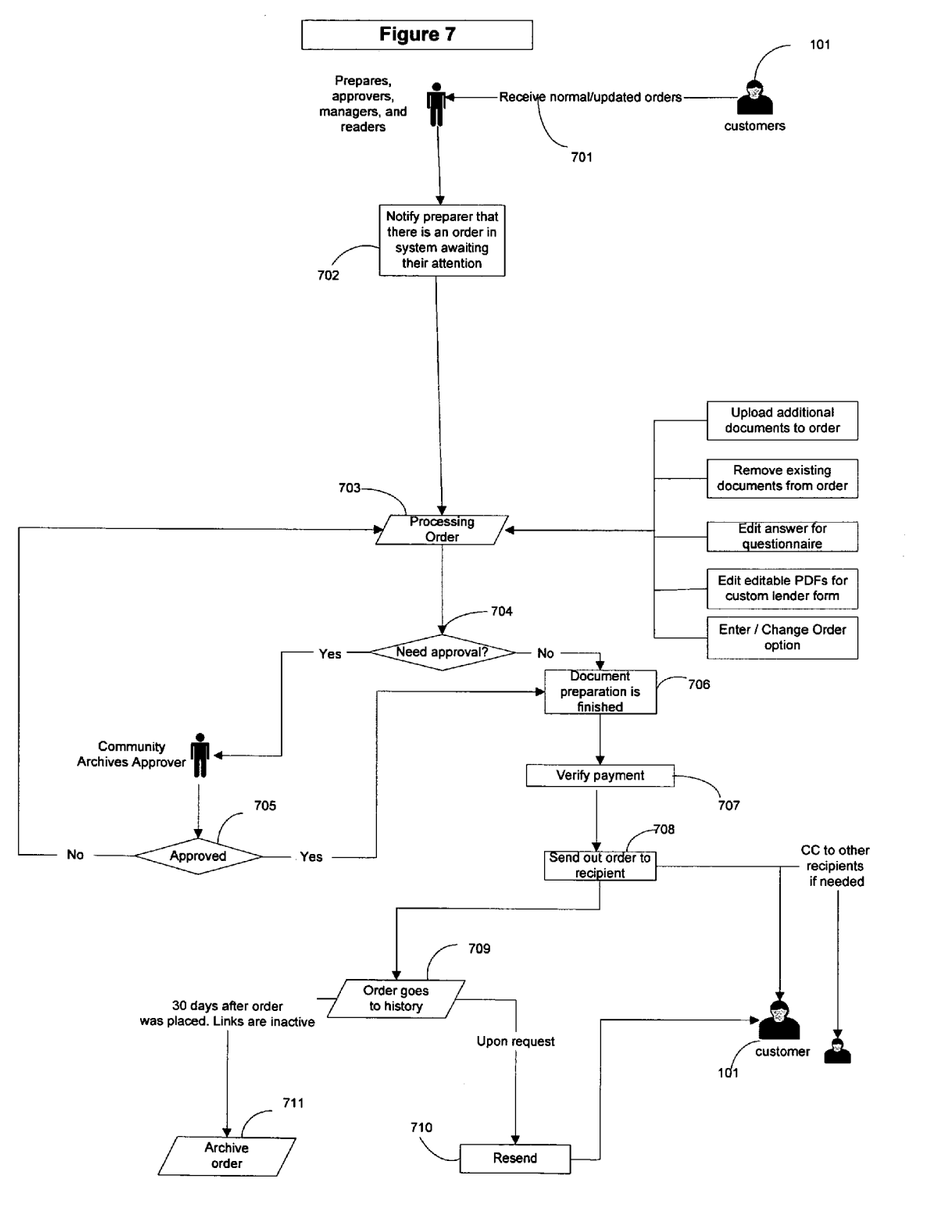
FIG. 7 illustrates processing the created order in accordance with an embodiment of the present invention.

The created order is processed according to the steps discussed below in connection with FIG. 7. FIG. 7 illustrates the processing of the created order in accordance with an embodiment of the present invention.

Referring to FIG. 7, in connection with FIGS. 1 and 2, system 102 is designed to address any number of "business and operational models" which might be desired by an association and/or management company. Normal/updated orders from requestors 101 are received by preparers, approvers, managers and readers in step 701. Preparers are the staff members who review the created products to ensure that all information is correct, all attachments are in place, etc., before the order is sent to requestor 101. Readers are those association and/or management company staff members who have been provided authorization to "read" but not modify orders in system 102. The manager assignment is an option used when an association and/or management company desires to have a third party, typically an association manager, aware of all orders being placed in system 102 for the association(s) they manage. The approver is a designated association and/or management company staff member who has been assigned to "approve" all orders before the preparer can release the orders to requestor 101. System 102 is designed to allow the same, or different, preparers to be assigned to every association and for every product offered by that association and/or management company. Approvers, managers and readers can be assigned for each association individually. The association and/or management company has the ability to change preparers, approvers, managers and readers at any time.

Each time a product is ordered for any association set up in the system, system 102, in step 702, notifies the preparer assigned to that association/product by e-mail that there is an order in system 102 which is awaiting their attention. The preparer is provided with a number of details in this "notification e-mails" such as the type of order, community, person ordering, closing date, whether or not requestor 101 has asked for "expedited service," etc.

The screen viewed by the preparer is designed to allow each preparer to move and sort the various columns to allow the most efficient view and use of the screen based on their particular desire. The processing screen is also color coded to highlight orders which have been "expedited," "update requested," or both. In the event the preparer desires to find a specific order in process or in archives, they simply use the "search feature" which allows them to pull up orders based on a three field search function.

In step 703, the preparer processes the requestor's 101 order. System 102 allows the preparer to upload any documents which may be needed into an existing order. Once "uploaded," this new document becomes part of the electronic record, is delivered with the balance of the order, and remains an e-archive of that order. System 102 also allows the preparer to remove individual components of a product package should that attachment not be desired in that specific order.

Further, system 102 allows the association and/or management company preparer to change any number of fields from what was entered by requestor 101 (as they are processing the order). These fields include the delivery option chosen, the decision related to expediting the order, the buyer's name, the closing date, the unit/home address, etc. This flexibility allows the preparer, in working with requestor 101 to modify an active order to meet requestor's 101 needs, negating the requirement that the order be deleted and re-ordered. Requestors 101 may be required to give approval for any changes to fields that modify fees and charges.

Further, all answers to questions which are "pre-populated into the sub-questionnaires, can be modified at the time the order is being "processed." Changes to an answer during the processing of an order will change that single product. In the event the preparer desired to change that answer for all future products of that type (for that association), the preparer would simply change the answer on master questionnaire 312 for that association.

Additionally, preparers have the ability to work on orders, check off selected steps within each order, then return to the order at a later time/date, knowing which aspects of the order have been processed and which segment of an order still need to be reviewed or edited.

Furthermore, update order requests are displayed to the preparers by a red display alert, as well as a display of the original order number incorporated into the new "update order number." This feature allows the preparer to have immediate access and knowledge of the information in the original order.

Although the association and/or management company could perform all delivery options directly, system 102 provides a "single click" button to send selected alternative/additional delivery requests to a third party. One application of this design feature would be the strategy of having hardcopy overnight packages sent by a third party copy/mailing house, as opposed to the association and/or management company attempting to print large volume documents quickly, and making deadline for overnight delivery each day.

Furthermore, an order may be "recreated" at anytime by the preparer. This feature is used when the preparer desires to "start over" with the answering of questions which were not automatically populated when the order was created at the time the order was placed.

Upon processing the requestor's 101 order, a determination is made, in step 704, by system 102, as to whether approval is needed. If approval is needed, then, in step 705, the approver determines whether to approve or disapprove the order. If the approver disapproves the order, then, preparer processes the next requestor's 101 order in step 703.

If, however, the approver approves the order or if no approval is necessary, then, in step 706, the document preparation is finished.

In step 707, system 102 verifies payment. To ensure a product is not delivered prior to the appropriate payment being received, system 102 will not allow an order to be delivered for which the proper payment type has not been received and properly entered into the system. To ensure the order/product is delivered as soon as the proper payment type has been received, the preparer receives an e-mail from system 102 letting them know the payment process is complete and the order may be released.

In step 708, system 102 sends out the order to recipient 102 as well as to other recipients, if needed. A copy of the order goes to history in step 709.

Upon request by the association and/or management company or requestor 101, system 102 can resend the stored order in step 710. In some scenarios, an association and/or management company would be in a situation where they have "delivered" a product, then realized they need to modify that product (change information or contents), as there was a last minute change in information. Under this scenario, the association and/or management company can simple retrieve the order/product from history, make any needed adjustment and "resend the order/product" without the need to have requestor 101 re-enter information or the preparer start from scratch. Resend is also used when a requestor 101 has asked the order be redelivered to them, for whatever the reason.

After a period of time has elapsed (e.g., thirty days) after the order was completed, system 102 archives order in database 103 in step 711.

FIG. 7 may include other or additional aspects that were not depicted for clarity. The steps referred to above may be executed in any order and that the order discussed in connection with FIG. 7 is illustrative. Certain steps depicted in FIG. 7 may be executed in a substantially simultaneous manner or may be omitted.

Figure 8:
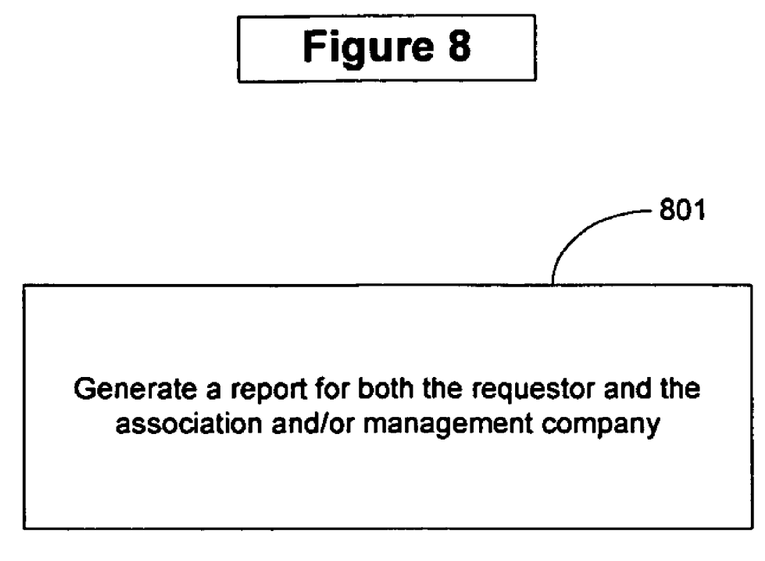
FIG. 8 illustrates providing reports to both the requestors as well as the community association and/or service provider in accordance with an embodiment of the present invention.

After processing the order, system 102 generates a report as discussed below in association with FIG. 8. FIG. 8 illustrates providing reports for both requestor 101 as well as the association and/or management company in accordance with an embodiment of the present invention. Referring to FIG. 8, in step 801, system 102 generates a report for both requestor 101 as well as the association and/or management company. These reports include a variety of formats and uses. From a simple requestor history log to a complete reconciliation and performance analysis report for associations and/or management companies, statistical analysis of staff performance, product profitability tracking, etc.

FIG. 8 may include other or additional aspects that were not depicted for clarity.

Although the method, computer program product and system are described in connection with several embodiments, it is not intended to be limited to the specific forms set forth herein, but on the contrary, it is intended to cover such alternatives, modifications and equivalents, as can be reasonably included within the spirit and scope of the invention as defined by the appended claims.

The invention claimed is:

1. An automated method for obtaining association data, comprising the steps of:
   receiving an order for a selection of one or more products from a requestor, wherein a description of said selection of one or more products is displayed to said requestor;
   using processor circuitry, building said order, wherein building said order comprises the steps of:
      obtaining appropriate information from a profile of said requestor,
      obtaining a first master questionnaire, wherein said first master questionnaire is associated with a first association, wherein said first association pre answers one or more of a set of questions contained in said first master questionnaire;
      building a sub-questionnaire, wherein information in said first master questionnaire is incorporated into said sub-questionnaire; and
      acquiring appropriate data to be placed into an order package; and
   using processor circuitry, determining a price of said order based on pricing tables;
   providing one or more payment methods for said price of said order; and
   delivering said selection of one or more products ordered to said requestor; and wherein said first association is provided an option as to which of said set of questions are to be answered by said requestor at time order is placed.

2. The method as recited in claim 1, further comprising the step of:
   generating a receipt for said payment of said selection of one or more products ordered.

3. The method as recited in claim 1, further comprising the step of:
   restricting types of products displayed to a preparer based on user type of said requestor.

4. The method as recited in claim 1, further comprising the step of:
   restricting payment options displayed to said requested based on user type of said requestor.

5. The method as recited in claim 1, further comprising the step of:
   providing different delivery methods based on said one or more products being ordered.

6. The method as recited in claim 1, wherein said selection of one or more products is priced differently for every association.

7. The method as recited in claim 1, further comprising the step of:
   triggering a flag to be displayed to said requestor when a closing is approaching.

8. The method as recited in claim 1, wherein said first master questionnaire comprises one or more of the following: questions, answers, date fields, titles and instructions.

9. The method as recited in claim 8, wherein information in said first master questionnaire is modified for said first association.

10. The method as recited in claim 1, wherein a second association is associated with a second master questionnaire, wherein said second association pre-answers questions contained in said second master questionnaire, wherein said pre-answers for said second association is a different set of pre-answers than said pre-answers for said first association.

11. The method as recited in claim 1, wherein said profile of said requestor indicates an individual who will be receiving orders.

12. The method as recited in claim 1, wherein said profile of said requestor indicates that said requestor is part of a user group.

13. The method as recited in claim 1, further comprising the step of:
   receiving an expedited request from said requestor to expedite processing of said order, wherein said requestor is charged an expedited fee based on said selection of one or more products ordered.

14. The method as recited in claim 1, wherein said selection of one or more products ordered by said requestor comprises a custom form.

15. The method as recited in claim 1, further comprising the step of:
   generating a report for both said requestor and said first association.

16. A computer program product with program instructions on a non-transitory computer readable medium for obtaining association data, comprising the programming steps of:
   receiving an order for a selection of one or more products from a requestor, wherein a description of said selection of one or more products is displayed to said requestor;
   building said order, wherein building said order comprises the programming steps of:
      obtaining appropriate information from a profile of said requestor,
      obtaining a first master questionnaire, wherein said first master questionnaire is associated with a first association, wherein said first association pre-answers one or more of a set of questions contained in said first master questionnaire;
      building a sub-questionnaire, wherein information in said first master questionnaire is incorporated into said sub-questionnaire; and
      acquiring appropriate data to be placed into an order package; and
   determining a price of said order based on pricing tables;
   providing one or more payment methods for said price of said order; and delivering said selection of one or more products ordered to said requestor;
wherein said first association is provided an option as to which of said set of questions are to be answered by said requestor at time order is placed.

17. The computer program product as recited in claim 16, further comprising the programming step of:
    generating a receipt for said payment of said selection of one or more products ordered.

18. The computer program product as recited in claim 16, further comprising the programming step of:
    restricting types of products displayed to said requestor based on user type of said requestor.

19. The computer program product as recited in claim 16, further comprising the programming step of;
    restricting payment options displayed to said requested based on user type of said requestor.

20. The computer program product as recited in claim 16, further comprising the programming step of:
    providing different delivery methods based on said one or more products being ordered.

21. The computer program product as recited in claim 16, wherein said selection of one or more products is priced differently for every association.

22. The computer program product as recited in claim 16, further comprising the programming step of:
    triggering a flag to be displayed to a preparer when a closing is approaching.

23. The computer program product as recited in claim 16, wherein said first master questionnaire comprises one or more of the following: questions, answers, date fields, titles and instructions.

24. The computer program product as recited in claim 23, wherein information in said first master questionnaire is modified for said first association.

25. The computer program product as recited in claim 16, wherein a second association is associated with a second master questionnaire, wherein said second association pre-answers questions contained in said second master questionnaire, wherein said pre-answers for said second association is a different set of pre-answers than said pre-answers for said first association.

26. The computer program product as recited in claim 16, wherein said profile of said requestor indicates an individual who will be receiving orders.

27. The computer program product as recited in claim 16, wherein said profile of said requester indicates that said requester is part of a user group.

28. The computer program product as recited in claim 16, further comprising the programming step of:
    receiving an expedited request from said requester to expedite processing of said order, wherein said requester is charged an expedited fee based on said selection of one or more products ordered.

29. The computer program product as recited in claim 16, wherein said selection of one or more products ordered by said requester comprises a custom form.

30. The computer program product as recited in claim 16, further comprising the programming step of:
    generating a report for both said requester and said first association.

31. A system for obtaining association data, comprising:
    a memory unit operable for storing a computer program for obtaining association data;
    a processor coupled to said memory unit, wherein said processor, responsive to said computer program, comprises:
        circuitry for receiving an order for a selection of one or more products from a requestor, wherein a description of said selection of one or more products is displayed to said requestor;
        circuitry for building said order, wherein circuitry for building said order comprises:
            circuitry for obtaining appropriate information from a profile of said requestor,
            circuitry for obtaining a first master questionnaire, wherein said first master questionnaire is associated with a first association, wherein said first association pre-answers one or more of a set of questions contained in said first master questionnaire;
            circuitry for building a sub-questionnaire, wherein information in said first master questionnaire is incorporated into said sub-questionnaire; and
            circuitry for acquiring appropriate data to be placed into an order package; and
        circuitry for determining a price of said order based on pricing tables;
        circuitry for providing one or more payment methods for said price of said order; and
        circuitry for delivering said selection of one or more products ordered to said requestor;
wherein said first association is provided an option as to which of said set of questions are to be answered by said requestor at time order is placed.

32. The system as recited in claim 31, wherein said processor further comprises:
    circuitry for generating a receipt for said payment of said selection of one or more products ordered.

33. The system as recited in claim 31, wherein said processor further comprises:
    circuitry for restricting types of products displayed to said requestor based on user type of said requester.

34. The system as recited in claim 31, wherein said processor further comprises:
    circuitry for restricting payment options displayed to said requested based on user type of said requester.

35. The system as recited in claim 31, wherein said processor further comprises:
    circuitry for providing different delivery methods based on said one or more products being ordered.

36. The system as recited in claim 31, wherein said selection of one or more products is priced differently for every association.

37. The system as recited in claim 31, wherein said processor further comprises:
    circuitry for triggering a flag to be displayed to a preparer when a dosing is approaching.

38. The system as recited in claim 31, wherein said first master questionnaire comprises one or more of the following: questions, answers, date fields, titles and instructions.

39. The system as recited in claim 38, wherein information in said first master questionnaire is modified for said first association.

40. The system as recited in claim 31, wherein a second association is associated with a second master questionnaire, wherein said second association pre answers questions contained in said second master questionnaire, wherein said pre-answers for said second association is a different set of pre-answers than said pre-answers for said first association.

41. The system as recited in claim 31, wherein said profile of said requestor indicates an individual who will be receiving orders.

42. The system as recited in claim 31, wherein said profile of said requestor indicates that said requestor is part of a user group.

43. The system as recited in claim 31, wherein said processor further comprises:
   circuitry for receiving an expedited request from said requestor to expedite processing of said order, wherein said requestor is charged an expedited fee based on said selection of one or more products ordered.

44. The system as recited in claim 31, wherein said selection of one or more products ordered by said requestor comprises a custom form.

45. The system as recited in claim 31, wherein said processor further comprises:
   circuitry for generating a report for both said requestor and said first association.

46. The system as recited in claim 31, wherein said system is implemented using an application service provider model.

* * * * *